United States Patent
Carter et al.

(10) Patent No.: US 9,251,266 B2
(45) Date of Patent: Feb. 2, 2016

(54) ASSISTING USERS IN SEARCHING FOR TAGGED CONTENT BASED ON HISTORICAL USAGE PATTERNS

(75) Inventors: Bernadette A Carter, Cary, NC (US); Belinda Y Chang, Cary, NC (US); Fuyi Li, Sudbury, MA (US); Pamela A Nesbitt, Tampa, FL (US); Lisa A Seacat, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1394 days.

(21) Appl. No.: 12/167,397

(22) Filed: Jul. 3, 2008

(65) Prior Publication Data

US 2010/0005106 A1    Jan. 7, 2010

(51) Int. Cl.
*G06F 17/30* (2006.01)

(52) U.S. Cl.
CPC .... *G06F 17/30867* (2013.01); *G06F 17/30876* (2013.01); *G06F 17/30884* (2013.01)

(58) Field of Classification Search
CPC ............... G06F 17/30867; G06F 17/30876; G06F 17/30884
See application file for complete search history.

(56) References Cited

U.S. PATENT DOCUMENTS

| 7,284,232 | B1 * | 10/2007 | Bates | G06F 17/30884 707/E17.114 |
| 7,404,150 | B2 * | 7/2008 | Clark et al. | 715/810 |
| 7,698,720 | B2 * | 4/2010 | Matz | 725/34 |
| 7,818,336 | B1 * | 10/2010 | Amidon et al. | 707/769 |
| 2002/0147724 | A1 * | 10/2002 | Fries | G06F 17/30864 |
| 2004/0143796 | A1 * | 7/2004 | Lerner et al. | 715/538 |
| 2004/0236736 | A1 * | 11/2004 | Whitman et al. | 707/3 |
| 2005/0033777 | A1 * | 2/2005 | Moraes et al. | 707/202 |
| 2006/0010117 | A1 * | 1/2006 | Bonabeau et al. | 707/3 |
| 2006/0156209 | A1 * | 7/2006 | Matsuura et al. | 714/798 |
| 2006/0235843 | A1 * | 10/2006 | Musgrove et al. | 707/6 |
| 2007/0185858 | A1 * | 8/2007 | Lu et al. | 707/5 |
| 2008/0027914 | A1 * | 1/2008 | Caputo et al. | 707/3 |
| 2008/0104030 | A1 * | 5/2008 | Choi | G06Q 30/00 |
| 2008/0215583 | A1 * | 9/2008 | Gunawardena et al. | 707/7 |
| 2008/0300964 | A1 * | 12/2008 | Raghunandan | 705/10 |
| 2008/0301112 | A1 * | 12/2008 | Wu | 707/5 |
| 2009/0043789 | A1 * | 2/2009 | Gupta | 707/100 |

(Continued)

OTHER PUBLICATIONS

"Exchangeable image file format for digital still cameras: Exif Version 2.2," by Technical Standardization Committee on AV & IT Storage Systems and Equipment (2002). Available at: http://www.kodak.com/global/plugins/acrobat/en/service/digCam/exifStandard2.pdf.*

(Continued)

*Primary Examiner* — Daniel Kinsaul
(74) *Attorney, Agent, or Firm* — Patents on Demand P.A.; Brian K. Buchhelt; Scott M. Garrett

(57) ABSTRACT

A tagging event can be detected where a software entity is associated with a tag resulting from a user interaction. At least one situational attribute relating to the tagging event can be automatically determined. The one or more situational attribute can be stored in a data repository so that the stored situational attribute is associated with the tag. The detecting, determining, and storing can be repeated for a set of different tags, each associated with a software entity. A search of tagged software entities can be conducted. The results of the search can be modified based at least in part upon the stored situational attributes of the tagged software entities.

20 Claims, 3 Drawing Sheets

(56) References Cited

U.S. PATENT DOCUMENTS

| | | | |
|---|---|---|---|
| 2009/0089288 A1* | 4/2009 | Petersen ........................ | 707/9 |
| 2009/0132516 A1* | 5/2009 | Patel et al. ..................... | 707/5 |
| 2009/0144240 A1* | 6/2009 | Singh et al. .................... | 707/3 |
| 2009/0150342 A1* | 6/2009 | Muller et al. ................... | 707/3 |
| 2009/0209270 A1* | 8/2009 | Gutierrez et al. .............. | 455/456.3 |

OTHER PUBLICATIONS

"Using Context to Navigate Through a Photo Collection," by Pauty et al. In: MobileHCI'05 (2005). Available at: ACM.*

* cited by examiner

ASSISTING USERS IN SEARCHING FOR TAGGED CONTENT BASED ON HISTORICAL USAGE PATTERNS

BACKGROUND OF THE INVENTION

The present invention relates to the field of content tagging and, more particularly, to assisting users in searching for tagged content based on historical usage patterns.

With the explosion of user generated and non-user generated content, tagging has become a key part in the organization process. Frequently, users organize content using a personalized tagging scheme based on what they feel is relevant and appropriate. That is, content tags can be affected by a user's personality, knowledge of content, mood, primary language, and various other factors. While this is a great strength of tagging, it quickly leads to user-centric tags. User-centric tags counteract the organization provided by tagging and increase the difficulty in searching for tagged content. For example, while a user can tag a Web page about game consoles with the tag "gaming", another user may tag the same Web page with the keyword "game platforms". As such, users often have to guess as to what an appropriate tag would be for content. Additionally, a user can often unintentionally use several variants of a tag keyword to tag content. For instance, a user can keyword tag a picture of a "church" with the keyword "church" and at a later date tag another picture of a church as "cathedral".

Further, content is often inadvertently tagged with the wrong keyword(s) resulting in content being incorrectly categorized and/or stored. Searching for incorrectly tagged and/or mislabeled content can be a frustrating and time consuming endeavor which detracts from the user experience. At present, there is no solution to compensate for the drawbacks associated with tagging.

BRIEF SUMMARY OF THE INVENTION

The present invention can include a method, system, and computer program product for improving searches of tagged entities based upon usage patterns. A tagging event can be detected, where a software entity is associated with a tag responsive to a user interaction. At least one situational attribute relating to the tagging event can be automatically determined. Situational attributes can include a time of tagging or entity utilization, a location of usage, a context of usage, etc. The at least one situational attribute can be stored in a data repository so that the stored situational attribute is associated with the new tag. A search of tagged software entities can be conducted, where the search utilizes the at least one situational attribute of the tag to determine if the tag should be part of a result set for the search. At the time of the search, a number of search-time situational attributes can be determined or user specified which are compared against the stored situational attributes.

DETAILED DESCRIPTION OF THE INVENTION

Figure 1:
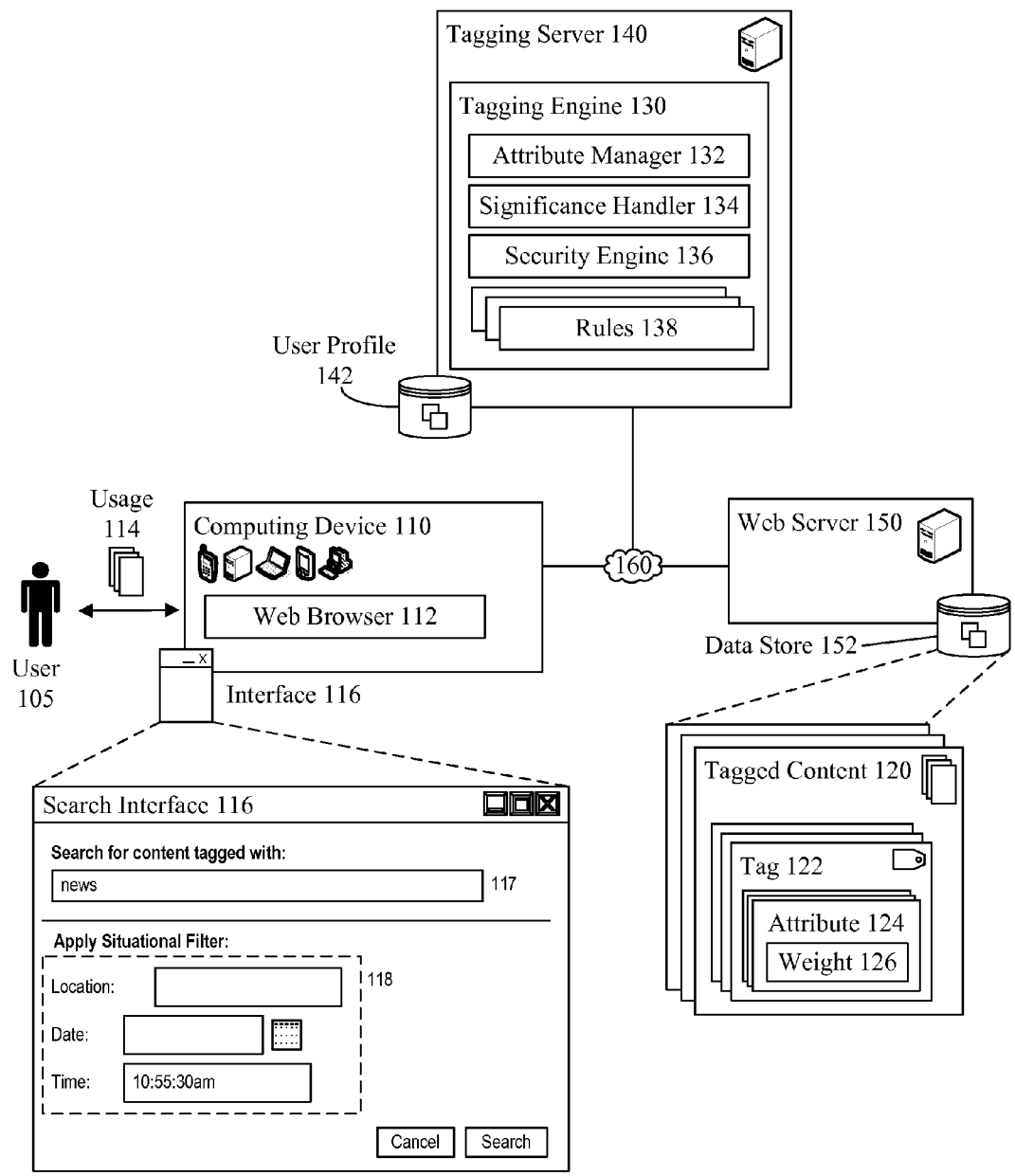
FIG. 1 is a schematic diagram illustrating a system for assisting a user in finding tagged content utilizing historic tagging usage patterns in accordance with an embodiment of the inventive arrangements disclosed herein.

The present invention discloses a solution for assisting users in searching for tagged content based on situational attribute information automatically gathered based upon usage context. In the solution, when a user tags content with a tag keyword, simple attributes associated with a state of a computer/browser at the time of the tagging can be stored along with the tag. These attributes can include, but are not limited to, location, time, date, program used for tagging, type of content being tagged, and the like. As tags and/or tagged content are used, situational attributes can be updated to reflect usage characteristics. Whenever a search is conducted, search-time situational data can be gathered. A correspondence between the search-time situational data and the stored situational attributes can affect search results. For example, an order of results and/or a determination of which results are applicable can be based upon the correspondence. In another example, filters can be applied to minimize an initial set of returned results based upon whether stored situational attributes associated with a tagged entity match values present at search time.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD- ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for assisting a user in finding tagged content utilizing historic tagging usage patterns in accordance with an embodiment of the inventive arrangements disclosed herein. That is, system state information can be stored in one or more situational attributes 124 to determine a usage/tagging context for tagged content 120. Whenever a search (interface 116) of tagged content 120 is performed, search-time situational conditions can be determined. These search-time situational conditions can be compared to suitable ones of the attributes 124 and search results can be modified based upon the correspondence between search time situational conditions and the stored attributes 124. This helps add a usage context based factor to tagged content 120, which is typically unstructured and context independent, which results in search difficulties. In one embodiment, multiple different tags 122 can be utilized during a single search, each associated with a different situational attribute 124. Further, the condition/tag comparison can be one of many factors used in forming the search results. Additionally, in one embodiment, the comparison operations involving the conditions and tag values can be performed using any combination of comparison operators (e.g., AND, OR, NOT, GREATER THAN, LESS THAN, etc.) and programmatic logic.

System 100 shows many tagging functions being performed by tagging server 140, which is connected to network 160 and is remotely located from computing device 110 and from Web server 150. This configuration can be useful when implementing usage based tagged software entity enhancements without modifying client (device 110) or server (150) functionality. For example, the tagging server 140 can provide usage based enhancements as a Web service, which can be integrated to search results produced by server 150. The invention is not to be construed as limited in this regard. The tagging functions/search enhancements of system 100 can be executed by client side (device 110), server side (Web server 150), middleware based, and/or network based components (tagging server 140) depending upon implementation choices. Appreciately, different implementation choices can cause functional components to deviate from those illustrated in FIG. 1. For example, in an implementation where Web server 150 implements usage based tagging enhancements, the tagging engine 130 shown in tagging server 140 can be included in server 150. Implementation flexibility is specifically expressed in FIG. 1 by showing how data store 152 that associated with Web server 150 can be used to store situational attributes 124. These attributes 124 can be alternatively be stored in data store 142 in a tagging server 140 centric implementation. Similarly, if device 110 implements local tagging based upon usage 114 data, engine 130 and detailed functionality therein can be included in device 110.

More specifically, system 100 shows a user 105 utilizing a computing device 110 having a Web browser 112. The Web browser 112 can tag content served remotely (server 150) and or can tag local content. Tagged content 120 can include, but is not limited to, files, uniform resource locators (URLs), Web pages, emails, events, objects, and the like. When tagging events occur, situational data (114) can be gathered concerning device 110, browser 112, and/or user 105 information at the time of the tagging event. This information can be used to populate situational attributes 124 associated with the tagged content 120 itself and/or the tag 122 used to reference content 120. In one embodiment, attribute manager 132 can capture data 114. Additionally, each time tagged content 120 is used, data 114 can be determined and used to update attribute 124 values. Thus, the situational attributes 124 can represent a usage pattern for the tagged content 120 for a given user 105.

In one embodiment, situational attribute 124 data can be shared among a set of users 105. For example, a Web search engine (email search engine, file search engine, etc.) can gather usage data from all users concerning tagged objects, and can use this data as one of the criteria when delivering results. When results are shared, user 105 specific usage data 114 can be weighted over generic usage data of other users to bias results to usage habits of a particular user 105.

A search interface 116 can utilize the situational attributes 124 when providing search results. That is, results of a search 117 can be modified/adjusted based upon how search-time situational conditions compare with usage based attributes 124 of the tagged content 120. This modification can be user 105 transparent or user interactive. For example, in one embodiment, tagged content 120 appearing within search 117 results must have attributes 124 that match search-time conditions. In another embodiment, a set of content 120 items appearing in search 117 result can be independent of the attribute 124 based comparisons with the search-time conditions, but an order that results are presented can be based at least in part upon a comparison of attribute 124 values to search time conditions. In still another embodiment, results can be provided independent of attribute 124 values, which can be actively filtered, as shown by filter section 118. That is, a user can be prompted to filter 118 results by various attributes 124. Search result behavior can be configurable based upon user 105 established settings, interface 116 specific code, and/or tagging engine 130 implementation choices.

Tagging functions can be performed by a tagging engine 130. The tagging engine 130 can include an attribute manager 132, a significance handler 134, a security engine 136, and a rules component 138. User profile 142 information can be optionally stored when user 105 specific settings are important.

The attribute manager 132 can capture usage 114 data, process it, and store it as one or more situation attributes 124. These attributes 124 can be stored local to server 140 separate from the tagged content 120 and/or can be stored local to the tagged content 120, such as within metadata of content 120. Actual storage specifics are unimportant, so long an association is maintained between tagged content 120 and the corresponding attribute.

Significance handler 134 can determine a relative significance of search attribute 124 for a given situation and can apply various weights 126 to the attributes 124 to reflect their relative import. Significance handler 134 can be used to weigh one attribute 124 over others when multiple different attributes 124 are compared against system conditions for a single search. For example, a time characteristic and a location characteristic (condition) can both be used (compared against attributes 124 for time and location) when generating results for a given search, where the location characteristic can be afforded twice the weight of the time characteristic within the search.

The security engine 136 can permit one or more users 105 to access a set of situation attributes 124 and/or tags 122. For example, a user 105 may restrict a set of tags 122 and situational attributes 124, while sharing other tags 122 and related attributes 124. For example, a set of Web sites tagged by a user 105 in a work context may be shared among co-workers. A set of emails tagged by project may be shared with project team members. Security engine 136 establishes and enforces security policies.

The rules 138 can establish a set of programmatic rules to be applied by other engine 130 components. For example, the usage gathering rules 114 for one person and/or for one platform may vary depending upon software residing upon device 110. For example, a work owned device 110 can include software that gathers usage data 114 from all users for purposes of establishing a situation attribute 124 repository to aid with work related searches. A more rudimentary set of usage data 114 gathering rules can apply to usages performed by a personal or mobile computing device 110. Separating various rules 138 outside other engine 130 components 130 can make it easier to enable profile 142 specific behavior and/or to situationally upgrade/change behavior of engine 130 with a minimal amount of service interruption.

The rules 138 can also specify the programmatic logic relating to the tagged attributes 124. Tagged attributes can be compared using any set of one or more conditions. For example, any conditional statement (using binary logic) able to be evaluated as TRUE or FALSE can be utilized when comparing tag attributes 124 to a current set of conditions. Thus, operands of AND, OR, NOT, and combinations thereof (e.g., parenthesis can be supported to dictate operand evaluation order) can be utilized in system 100.

As used herein, a tag 122 can include an alphanumeric label (e.g. keyword) associated with one or more portions of digital content. Tag 122 can be associated with one or more attribute 124 values. Attribute 124 can include, but is not limited to, a date, a time, a location, the identity of a user performing a tagging process, a program used to tag content, and the like. The importance of an attribute 124 can be established by weight 126 value. Weight 126 can be a numeric value based on the significance established from historic usage patterns. In one embodiment, a weight 126 can be a value equivalent to the frequency in which the attribute is used in the tagging or search process.

Figure 2:
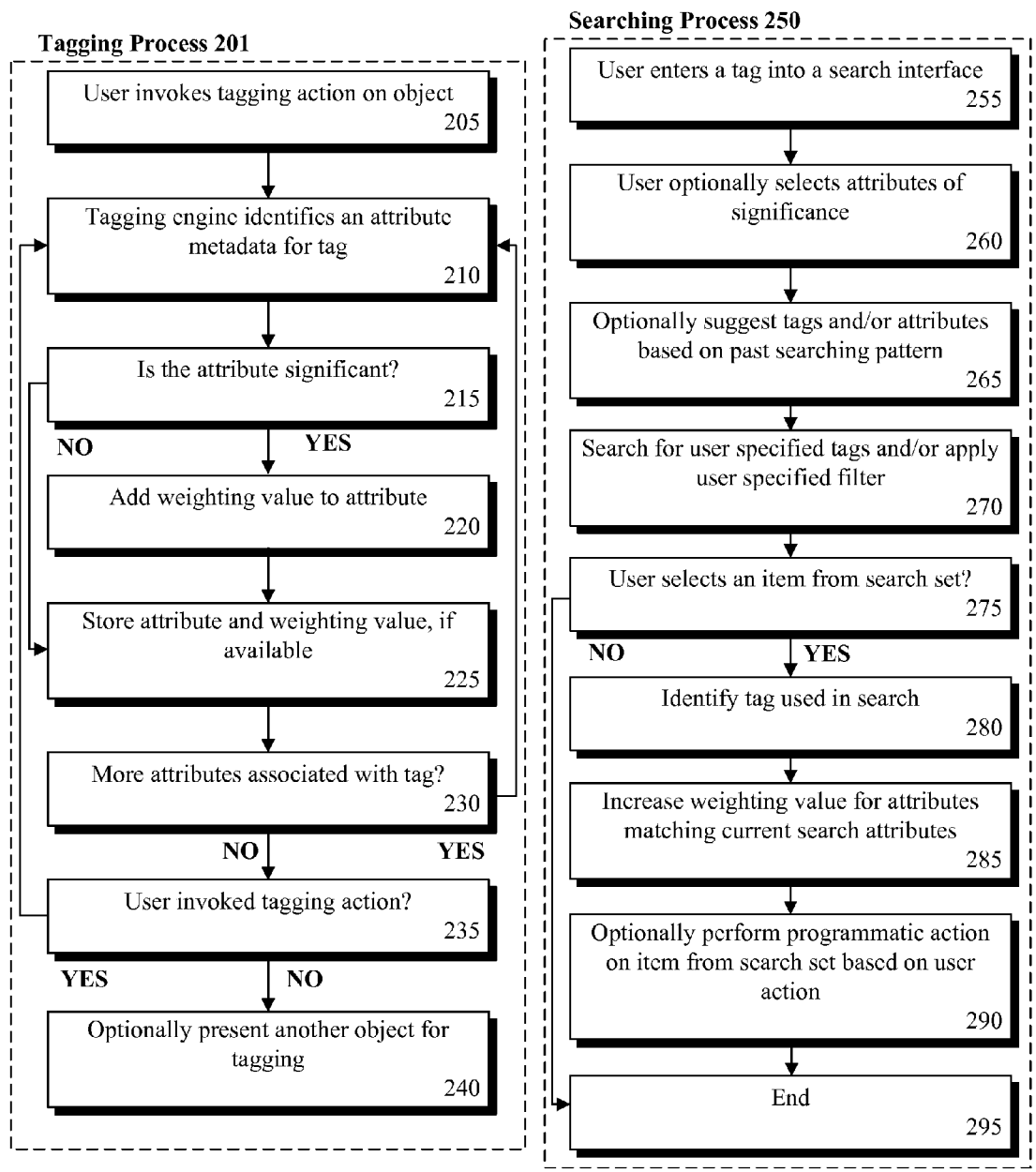
FIG. 2 is a flowchart illustrating a tagging process and a searching process for employing usage patterns in tagging activities in accordance with an embodiment of the inventive arrangements disclosed herein.

FIG. 2 is a schematic diagram illustrating a tagging process 201 and a searching process 250 for employing usage patterns in tagging activities in accordance with an embodiment of the inventive arrangements disclosed herein. Processes 201, 250 can be used in the context of system 100. In process 201, a user performing a tagging action can trigger tagging metadata to be stored with the associated tag keyword. Metadata can be an attribute value which can include, a date, a time, a location, an identity of a user performing the tagging process, program used to tag content, and the like. Stored attributes can aid a user during a search process 250. In search process 250, a user searching for tagged content can specify attributes within the search parameters enabling the user to refine the search.

In step 205, a user invokes a tagging action on an object. The tagging action can be performed manually by the user or can be a programmatic action triggered by the user. The object can include, but is not limited to, files, uniform resource locators (URLs), Web pages, emails, events, objects, and the like. In step 210, a tagging engine identifies an attribute metadata for a tag being assigned to the object. The attribute can be automatically determined by an attribute manager. In step 215, if the attribute has significance, the method can continue to step 220, else proceed to step 225. Attribute significance can be heuristically determined based on historic usage patterns. In step 220, a weighting value can be added to the attribute. The weighting value can be a numeric value based on the significance established from historic usage patterns. In step 225, the attribute can be stored along with an associated weighting value if available. In step 230, if more attributes associated with the tag are determined, the method can return to step 210, else continue to step 235. Any number of loops back to step 210 can occur to accommodate any number of different attributes. In step 235, if another tagging action is invoked by the user the method can return to step 210, else the method can proceed to step 240. In step 240, the user can be optionally presented with another object for tagging.

In step 255, a user can search for tagged content by entering a tag keyword in a search interface. In step 260, the user can optionally select attributes of significance to narrow the search field. In step 265, tags and/or attributes can be optionally suggested based on past searching patterns for the user. In one embodiment, a user can select logical operands (AND, OR, NOT, Parenthesis, etc.) to be applied when evaluating conditions and attributes (e.g., performing Boolean algebra based upon tag and condition values). In step 270, a search can be conducted based on the user specified tags and/or applied user specified filters. In step 275, if the user selects an item from the search set presented, the method can continue to step 280, else return to step 295. In step 280, the user entered tag for the search is determined and can be stored in a user profile for establishing historic search patterns. In step 285, the selected item and item attributes is determined and matching attributes weighting values are increased. Weighting value can be increased appropriately based on the degree of correlation to the selected search item and tag used in the search. In step 290, an optional programmatic action based on the user action can be performed on the item from the search set. In step 295, the method can end until another user search is performed.

Figure 3:
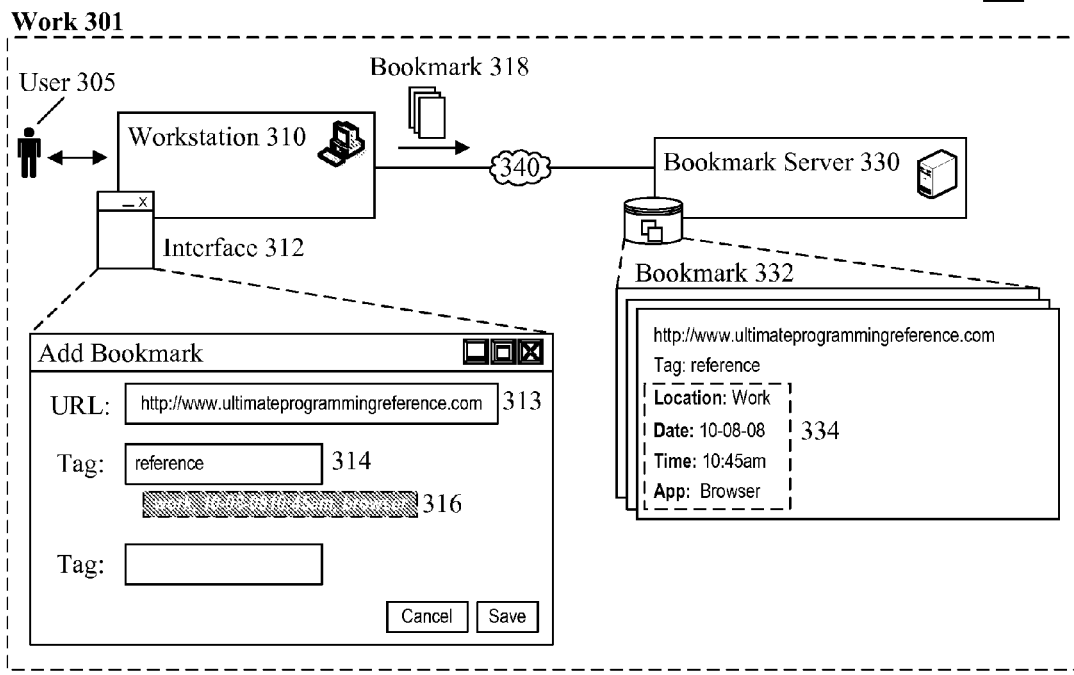
FIG. 3 is a schematic diagram illustrating a scenario for searching for tagged content using tagging usage patterns in accordance with an embodiment of the inventive arrangements disclosed herein.
Figure 3:
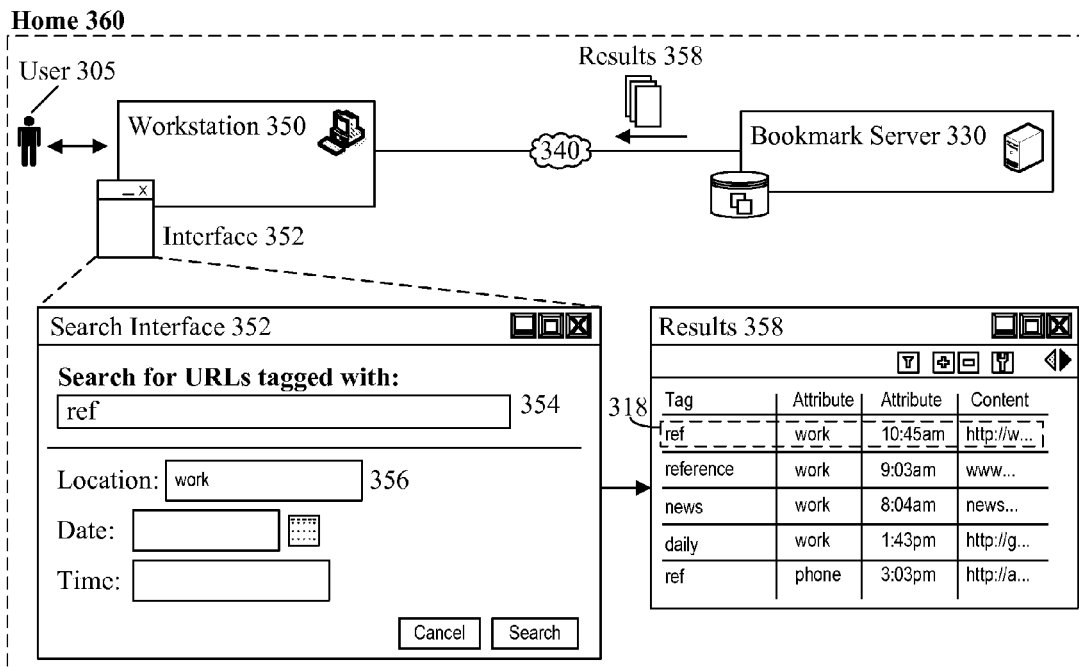

FIG. 3 is a schematic diagram illustrating a scenario 300 for searching for tagged content using tagging usage patterns in accordance with an embodiment of the inventive arrangements disclosed herein. In scenario 300, a user 305 can tag uniform resource locator (URL) 313 at a work 301 environment and utilize stored attributes of tag 318 to retrieve bookmark 318 at a home 360 environment. A user 305 utilizing a bookmark server 330 service can be assisted in searching for tagged content by utilizing tag attribute metadata 316.

At work 301 environment, user 305 interacting with an interface 312 executing on workstation 310 can tag URL 313. When user 305 creates tag 314 for URL 313, tagging engine 130 can be used to determine appropriate attributes 316. Tag attributes 316 can include, a date, a time, a location, a user performing the tagging process, a program used to tag, and the like. For example, the user can specify in interface 312 the location "work" to be used as attribute 316 location value. In one embodiment, attributes 316 can be presented to user 305 during the tagging process.

Content 313 and information 314, 316 can be conveyed as bookmark 318 to server 330 via network 340. Bookmark 318 associated with user 305 can be stored on server 330 as bookmark 332. Bookmark 332 can be indexed by URL 313, tag 314, and/or attributes 316. Attributes 316 can be organized by type 334 which can allow user 305 to specify an attribute type and value during the search process.

At home 360 environment, user 305 can search for and retrieve bookmark 318 using search interface 352. Employing search interface 352 executing on workstation 350, user 305 can find tagged content 318. In addition to providing a tag keyword to search for, interface 352 can allow user 305 to specify one or more attributes that can help narrow the search. For example, if the user 305 is unsure of the tag used at work 301 environment to tag URL 313, the user can specify the "work" attribute 356 to narrow the search of content tagged as tag 354 "ref".

When a search is performed by user 305, results 358 of the search can be conveyed to workstation 350. Search results 358 can be filtered based on user usage patterns, interface 352 customized settings, and the like. In one embodiment, results 358 can be a browsable result set comprised of tags and associated attributes. User 305 can select attributes to further narrow the search results 358. User 305 can readily identify previously tagged content 318 based on presentation of URL 313, associated tag, and attributes. Once the URL 318 is found, the user 305 can interact with selected content 318 and appropriate programmatic actions can be taken.

Scenario 300 is for illustrative purposes only and should not be construed to limit the invention in any regard. Client-server interaction described is only one possible embodiment of the present invention. Tagging functionality can be entirely present in server 330, workstation 310, 350, and the like.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improving searches of tagged entities based upon usage patterns comprising:

detecting, via computer program instructions stored in at least one storage medium that are executable by at least one processor, a tagging event where a user manually enters a tag for a software entity responsive to a user interaction;

automatically determining, via computer program instructions stored in at least one storage medium that are executable by at least one processor, at least one situational attribute relating to the tagging event where said automatically determined situation attribute relates to a state of a computer or browser at the time of the user interaction, wherein said situation attribute comprises a time, a date, a location of the user interaction, a program used for tagging, and type of content being tagged, wherein the situation attribute is determined without manual user input needed to enter values for the situation attribute;

storing, via computer program instructions stored in at least one storage medium that are executable by at least one processor, the at least one situational attribute in a data repository so that the stored situational attribute is associated with the tag;

repeating, via computer program instructions stored in at least one storage medium that are executable by at least one processor, the detecting, determining, and storing for a plurality of different tags, each associated with a software entity;

receiving, via computer program instructions stored in at least one storage medium that are executable by at least one processor, a request for performing a search;

receiving, via computer program instructions stored in at least one storage medium that are executable by at least one processor, a tag keyword for performing a search;

suggesting, via computer program instructions stored in at least one storage medium that are executable by at least one processor, at least one of an additional tag keyword and the situational attribute based on search patterns of the user;

receiving, via computer program instructions stored in at least one storage medium that are executable by at least one processor, a term comprising the at least one selected additional tag keyword and the attribute;

conducting, via computer program instructions stored in at least one storage medium that are executable by at least one processor, a search of tagged software entities using the tag keyword and the term that are matched against previously stored tag values to produce search results; and automatically determining a search-time attribute existing at a time the search is conducted, wherein the search-time attribute corresponds to the situational attribute, wherein said search-time attribute comprises a time, a date, and a location of the user interaction, wherein the search-time attribute is determined without manual user input needed to enter values for the search-time attribute, wherein the search results are modified based at least in part upon a correspondence between the stored situational attribute of the tagged software entities and the search-time attribute of the search.

2. The method of claim 1, further comprising:

determining, via computer program instructions stored in at least one storage medium that are executable by at least one processor, at least one search-time attribute existent at a time of the search, said search-time attribute comprising a time and date of the user interaction that caused the tagging event;

comparing, via computer program instructions stored in at least one storage medium that are executable by at least one processor, at least one search-time attribute to a corresponding at least one stored situational attribute for each of the tagged software entities to determine a correspondence between the at least one search-time attribute and the stored situational attribute of each of the tagged software entities, wherein the correspondence limits the search results to a time window based on the time and date; and modifying, via computer program instructions stored in at least one storage medium that are executable by at least one processor, the search results based upon the correspondence.

3. The method of claim 1, wherein the user interaction used when detecting the tagging event comprises a user manually entering text for the tag for a URI of the software entity via a Web browser interface, wherein the situation attributes stored with the tag, are not manually entered by the user; and wherein the conducting of the search occurs responsive to a user initiated action from within a Web browser to search for a set of URI's tagged with the value of the tag that was manually entered by the user, wherein the user further manually enters one or more values for specific ones of the situation attributes that are to be compared against the stored situation attributes when conducting the search.

4. The method of claim 1, wherein one of the situational aspects that is stored is a location of a computer used by a user that performed the user interaction, wherein the search is conducted at the location, wherein the search results only show those results having the location associated, wherein the modifying of the search results occurs in a user transparent manner without requiring explicit user interactions.

5. The method of claim 1, further comprising:

receiving, via computer program instructions stored in at least one storage medium that are executable by at least one processor, a user initiated bookmark from a Web browser of a client device to a bookmark server, wherein the bookmark comprises the tag, wherein the bookmark server performs the storing, wherein the conducting of the search occurs from the Web browser from a client to the bookmark server; and utilizing, via computer program instructions stored in at least one storage medium that are executable by at least one processor, the at least one situational attribute to determine if each of the tagged software entities should be included in the search results.

6. The method of claim 1, wherein the user interaction occurs from a Web browser of a computing device, wherein the tag is stored in a Web server, with which the Web browser was interacting, wherein the at least one situational attribute is stored in a tagging server implemented in middleware, which is remotely located from the computing device and form the Web server and that is connected to the computing device and the Web server via a network, said method further comprising:

utilizing, via computer program instructions stored in at least one storage medium that are executable by at least one processor, at least one of the tag and one of the tagged software entities;

storing, via computer program instructions stored in at least one storage medium that are executable by at least one processor, usage data relating to utilization specifics in the data repository so that the stored usage data is associated with the tagged software entity; and repeating, via computer program instructions stored in at least one storage medium that are executable by at least one processor, the utilizing and storage of the usage data for a plurality of different software entities; wherein the search results are modified based at least in part upon the stored situational attributes of the tagged software entities.

7. The method of claim 1, wherein said at least one situational attribute comprises a plurality of situational attributes, said method further comprising:

assigning, via computer program instructions stored in at least one storage medium that are executable by at least one processor, a weighed value to each of the situational attributes; and utilizing, via computer program instructions stored in at least one storage medium that are executable by at least one processor, the weighed value when modifying the search results.

8. The method of claim 1, further comprising:

sharing, via computer program instructions stored in at least one storage medium that are executable by at least one processor, the situational attribute data among a plurality of users, so that each of the plurality of users is able to utilize the stored situational attributes when conducting searches.

9. The method of claim 1, wherein each software entity is associated with a unique Uniform Resource Identifier (URI), wherein the search result is a search result from a web engine comprising a plurality of hyperlinks, one for each of the software entities, wherein each hyperlink is associated with a corresponding Uniform Resource Identifier (URI).

10. A computer program product for improving searches of tagged entities based upon usage patterns comprising:

a non-transitory computer usable storage medium having computer usable program code embodied therewith, the computer usable program code comprising:

computer usable program code configured to detect a tagging event where a software entity is associated with a tag responsive to a user interaction, wherein the tagging event is to bookmark a URL of a Web page by a user specified tag value input by a user via a Web browser interface;

computer usable program code configured to automatically determine at least one situational attribute relating to the tagging event, wherein the at least one situational attribute is an automatically determined value associated with a state of the computer upon which the Web browser executes or the Web browser at a time that the URL bookmarking occurred, wherein the at least one situational attribute comprises a date and time that the bookmarking occurred and a location of the computer used at the time the bookmarking occurred;

computer usable program code configured to store the at least one situational attribute and the user specified tag value in a data repository so that the stored situational attribute is associated with the tag;

computer usable program code configured to repeat the detecting, determining, and storing for a plurality of different tags, each associated with a software entity computer usable program code configured to receive a request for performing a search;

computer usable program code configured to receive a tag keyword for performing a search;

computer usable program code configured to suggest at least one of an additional tag keyword and the situational attribute based on search patterns of the user;

computer usable program code configured to receive a term comprising the at least one selected additional tag keyword and the attribute; and computer usable program code configured to conduct a search of tagged software entities when the user searches for previously bookmarked Web pages from the Web browser, wherein the search results are modified based at least in part upon the stored situational attributes of the tagged software entities, wherein the search of the tagged software entities is restricted by user input to the date, wherein the search results comprise only those bookmarked Web pages that were bookmarked on the date indicated by the user input.

11. The computer program product of claim 10, further comprising:

computer usable program code configured to determine at least one search-time attribute existent at a time of the search;

computer usable program code configured to compare at least one search-time attribute to a corresponding at least one stored situational attribute for each of the tagged software entities to determine a correspondence between the at least one search-time attribute and the stored situational attribute of each of the tagged software entities; and computer usable program code configured to modify the search results based upon the correspondence, wherein an order of tagged software entities included in the search results is based at least in part upon the correspondence.

12. The computer program product of claim 11, further comprising:

computer usable program code configured to utilize the at least one situational attribute to determine if each of the tagged software entities should be included in the search results.

13. The computer program product of claim 10, wherein one of the situational attributes comprises a location of the computer at which the bookmarking occurred, wherein the search of the tagged software entities is restricted by user input to the location, wherein the search results comprises only those bookmarked Web pages that were bookmarked using the computer at the location.

14. The computer program product of claim 10, further comprising:

computer usable program code configured to utilize at least one of the tag and one of the tagged software entities;

computer usable program code configured to store usage data relating to utilization specifics in the data repository so that the stored usage data is associated with the tagged software entity; and computer usable program code configured to repeat the utilizing and storage of the usage data for a plurality of different software entities; wherein the search results are modified based at least in part upon the stored situational attributes of the tagged software entities.

15. The computer program product of claim 10, wherein said at least one situational attribute comprises a plurality of situational attributes, said method further comprising:
- computer usable program code configured to assign a weighed value to each of the situational attributes; and
- computer usable program code configured to utilize the weighed value when modifying the search results.

16. The computer program product of claim 10, further comprising:
- computer usable program code configured to share the situational attribute data among a plurality of users, so that each of the plurality of users is able to utilize the stored situational attributes when conducting searches.

17. The computer program product of claim 10, wherein each software entity is associated with a unique Uniform Resource Identifier (URI), wherein the search result is a search result from a web engine comprising a plurality of hyperlinks, one for each of the software entities, wherein each hyperlink is associated with a corresponding Uniform Resource Identifier (URI).

18. A method for improving searches of tagged entities based upon usage patterns comprising:
- detecting, via computer program instructions stored in at least one storage medium that are executable by at least one processor, a tagging event where a manually entered tag keyword is referenced against a Uniform Resource Identifier (URI) that is unique to a software entity;
- automatically determining, via computer program instructions stored in at least one storage medium that are executable by at least one processor, at least one situational attribute relating to the tagging event, wherein said situation attributes are automatically determined without manual user input needed to enter values for the situation attributes, wherein the at least one situational attribute comprises a date and time that the bookmarking occurred and a location of the computer used at the time the bookmarking occurred;
- storing, via computer program instructions stored in at least one storage medium that are executable by at least one processor, the manually entered tag keyword and the related at least one situational attribute in a data repository so that the stored situational attribute is indexed to the tag keyword;
- repeating, via computer program instructions stored in at least one storage medium that are executable by at least one processor, the detecting, determining, and storing for a plurality of different tags, each associated with a software entity;
- receiving, via computer program instructions stored in at least one storage medium that are executable by at least one processor, a request for performing a search;
- receiving, via computer program instructions stored in at least one storage medium that are executable by at least one processor, a tag keyword for performing a search;
- suggesting, via computer program instructions stored in at least one storage medium that are executable by at least one processor, at least one of an additional tag keyword and the situational attribute based on search patterns of the user;
- receiving, via computer program instructions stored in at least one storage medium that are executable by at least one processor, a term comprising the at least one selected additional tag keyword and the attribute;
- a Web engine conducting, via computer program instructions stored in at least one storage medium that are executable by at least one processor, a search of tagged software entities by matching criteria for the search against previously stored tag keywords, which include said tag keyword to determine search results of a set of one or more software entities each having a unique Uniform Resource Identifier (URI), each software entity in the search results having an associated hyperlink to the URI;
- automatically determining one or more search-time attributes existing at a time the search is conducted, wherein each of the search-time attributes is determined without manual user input needed to enter values for the search-time attribute, and wherein each search time attribute corresponds to one of the at least one situational attributes;
- modifying the search results at least in part upon a correspondence between the stored situational attributes of the tagged software entities and the search-time attributes; and
- providing the modified search results as hyperlinks to the user via a browser as a response to the search.

19. The method of claim 18, wherein the situation attributes comprise a location, a time, and a date at which the user interaction resulting in the tagging event took place, wherein said situation attributes are automatically determined without manual user input needed to enter values for the situation attributes.

20. The method of claim 18, further comprising:
- sharing, via computer program instructions stored in at least one storage medium that are executable by at least one processor, the situational attribute data among a plurality of users, so that each of the plurality of users is able to utilize the stored situational attributes when conducting searches.

* * * * *